H. T. FINNELL & E. SCHERNIKOW.
SHOCK ABSORBER FOR VEHICLES.
APPLICATION FILED DEC. 3, 1910.
1,025,388.
Patented May 7, 1912.
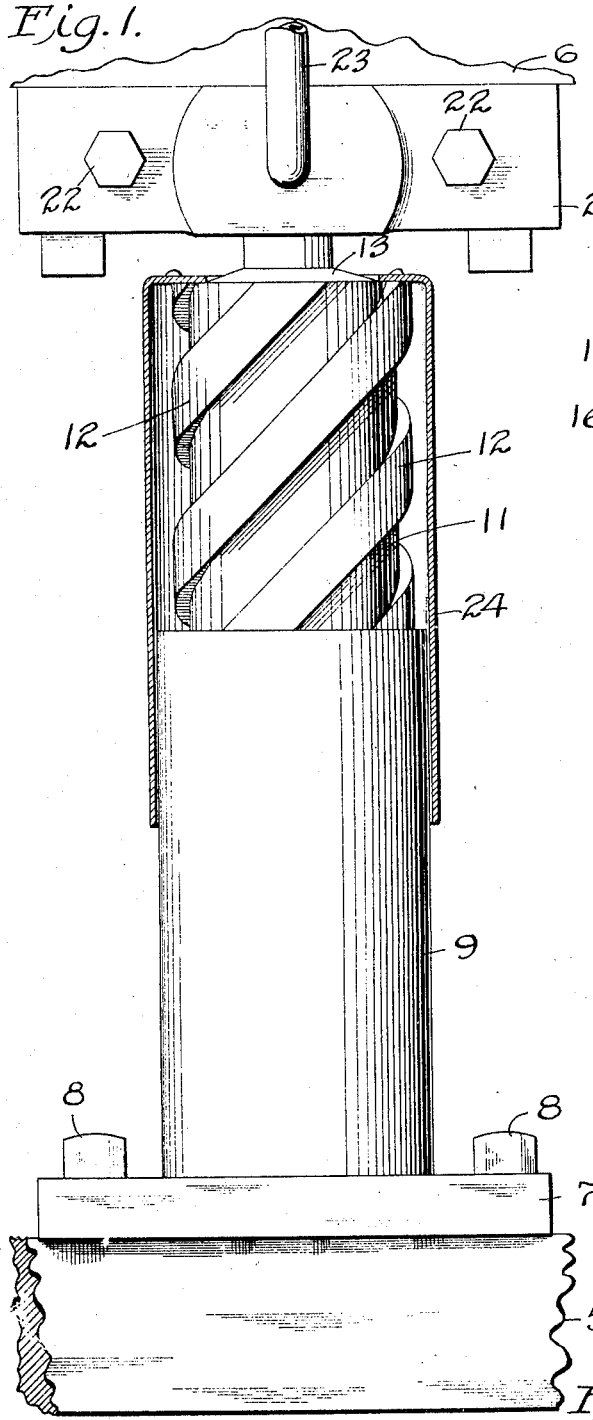
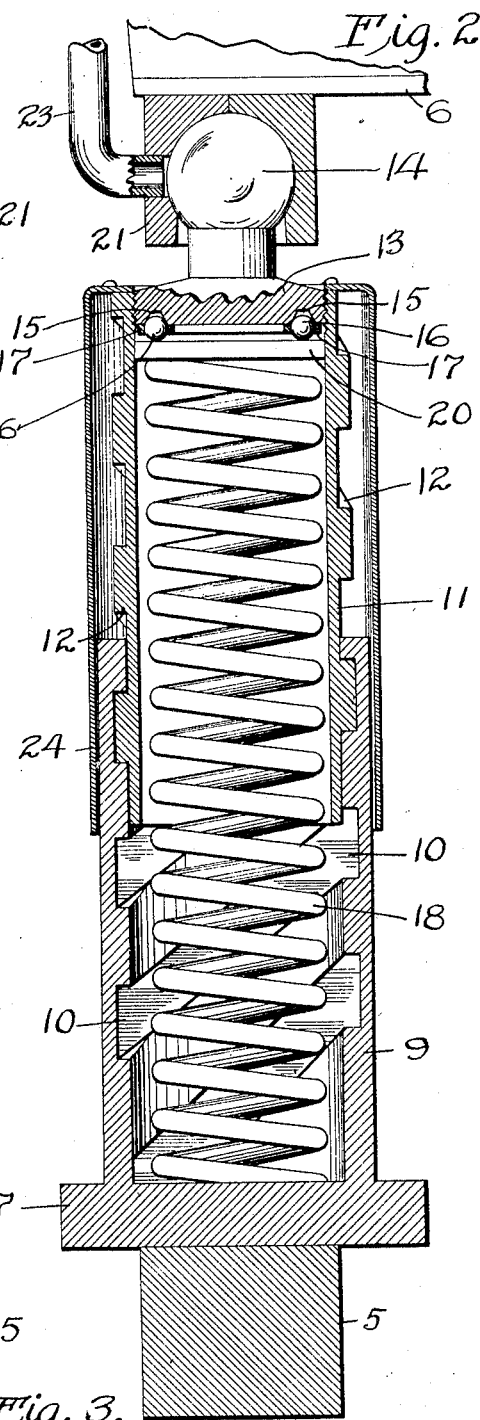
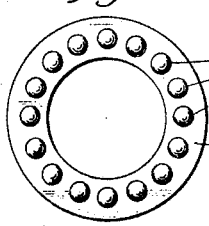
WITNESSES
INVENTORS
ATTORNEY

UNITED STATES PATENT OFFICE.

HIGHLAND T. FINNELL AND ERNEST SCHERNIKOW, OF NEW YORK, N. Y.

SHOCK-ABSORBER FOR VEHICLES.

1,025,388.  Specification of Letters Patent.  Patented May 7, 1912.

Application filed December 3, 1910. Serial No. 595,519.

*To all whom it may concern:*

Be it known that we, HIGHLAND T. FINNELL and ERNEST SCHERNIKOW, both citizens of the United States, and both residing in the borough of Manhattan, city, county, and State of New York, have invented certain new and useful Improvements in Shock-Absorbers for Vehicles, of which the following is a full and clear description.

The invention relates to means for relieving the sudden shock given to moving vehicles, such as automobiles, arising from the unevenness of roads traveled over, and its object is to provide a simple and easy working device to take up the sudden pressure exerted by the car of the vehicle upon the axle or rim as will be more fully described in the following specification, set forth in the claims and illustrated in drawings, accompanying this application. It is also adapted for use at the circumference of the wheel of a heavy vehicle such as an automobile, in which case it may be placed between the hub and the rim.

In the drawings Figure 1 is a side elevation of the absorber with its outer casing or covering in section. Fig. 2 is a vertical sectional view of the absorber. Fig. 3 is a detailed view of the ball bearing.

The device is adapted to be located between the axle (5) of the vehicle and the frame work (6) of its body. Secured to the axle (5) is a plate (7) carrying a vertical cylinder (9) provided with interior screw threads (10). The plate and the cylinder are secured to the axle by screws (8) or other convenient means. Within the cylinder (9) plays a plunger (11) having its exterior provided with threads (12) which fit within the interior threads of the outer cylinder (9). Into the upper end of the plunger is screwed or otherwise secured a head (13) carrying on its upper outer face a ball (14) while its under or interior side is provided with a raceway (15) to contain the ball bearings (16) which are retained in place by a ring (17). The plunger is held in its upward or outward position by means of the coil spring (18) but upon an abnormal weight or pressure being put upon the plunger, it is forced downward against the spring and in consequence of the threads (12) playing in corresponding grooves within the cylinder (9) the plunger is rotated. The weight or pressure upon the head (13) is sustained by the ring or washer (20) upon which rest the balls (16). The balls are free to play around the ring (20) and the ring will move up and down with the upper part of the spring (18). The ball (14) is confined within a block (21) which is made in two parts and held together by screws (22). A lubricant is furnished to the interior of the block through the pipe (23) from a designed source (not shown) so that the ball is furnished with sufficient lubrication to prevent wear and tear. The interior of the cylinder (9) may also be provided with oil in order to lessen the friction of the threads (12) within the cylinder, and lubricate the ball bearings. The ball (14) and its casing block (21) also acts as a universal joint which will allow for the movement of the plunger and for the lateral movement of the body with relation to the other parts of the vehicle. The rotating of the plunger caused by the spirals provides a source of resistance as it moves down the cylinder (9) and the air inclosed within the cylinder and compressed by the plunger also acts as a cushion.

In order to prevent dust and grit entering the spaces between the moving parts of the device an outer casing (24) is attached to the upper end of the plunger so as to inclose it and slides over the cylinder (9). This casing (24) should fit close enough to prevent the entrance of dust, but at the same time move easily over the outer face of the cylinder.

It is obvious that the parts may be otherwise arranged and the details modified without departing from the essential features of our invention as above described. It is also apparent that the device may be used at other points than between the axle and body. In case it is desired it may be used in series around the circumference of the wheels and the bearing face or tire.

What we claim as new and desire to secure by Letters Patent is:

1. In a shock absorber for use between two points of compression in a moving vehicle embodying hollow telescopic members mounted for spiral motion one about the other and a spring inclosed within said members, a head adjustable within the outer end of the inner member, a ring against which the outer end of said spring bears, balls resting on said ring, the inner face of said head being formed with a race way, and a ring interposed between the head and the first-named ring and in which said balls are retained.

2. In a shock absorber for use between two points of compression in a moving vehicle embodying hollow telescopic members mounted for spiral motion one about the other and a spring inclosed within said members, a head adjustable within the outer end of the inner member, a ring against which the outer end of said spring bears, balls resting on said ring, the inner face of said head being formed with a race way, and a ring interposed between the head and the first-named ring and in which said balls are retained, said head having a projection with a ball, and a sectional socket for said ball provided with means for supplying a lubricant thereto.

HIGHLAND T. FINNELL.
ERNEST SCHERNIKOW.

Witnesses:
WALTER E. RODE,
BERNARD V. TRAYNOR.